Sept. 23, 1924.                                                1,509,665
C. B. BUCHANAN ET AL
CURRENT COLLECTOR
Filed Aug. 1, 1921
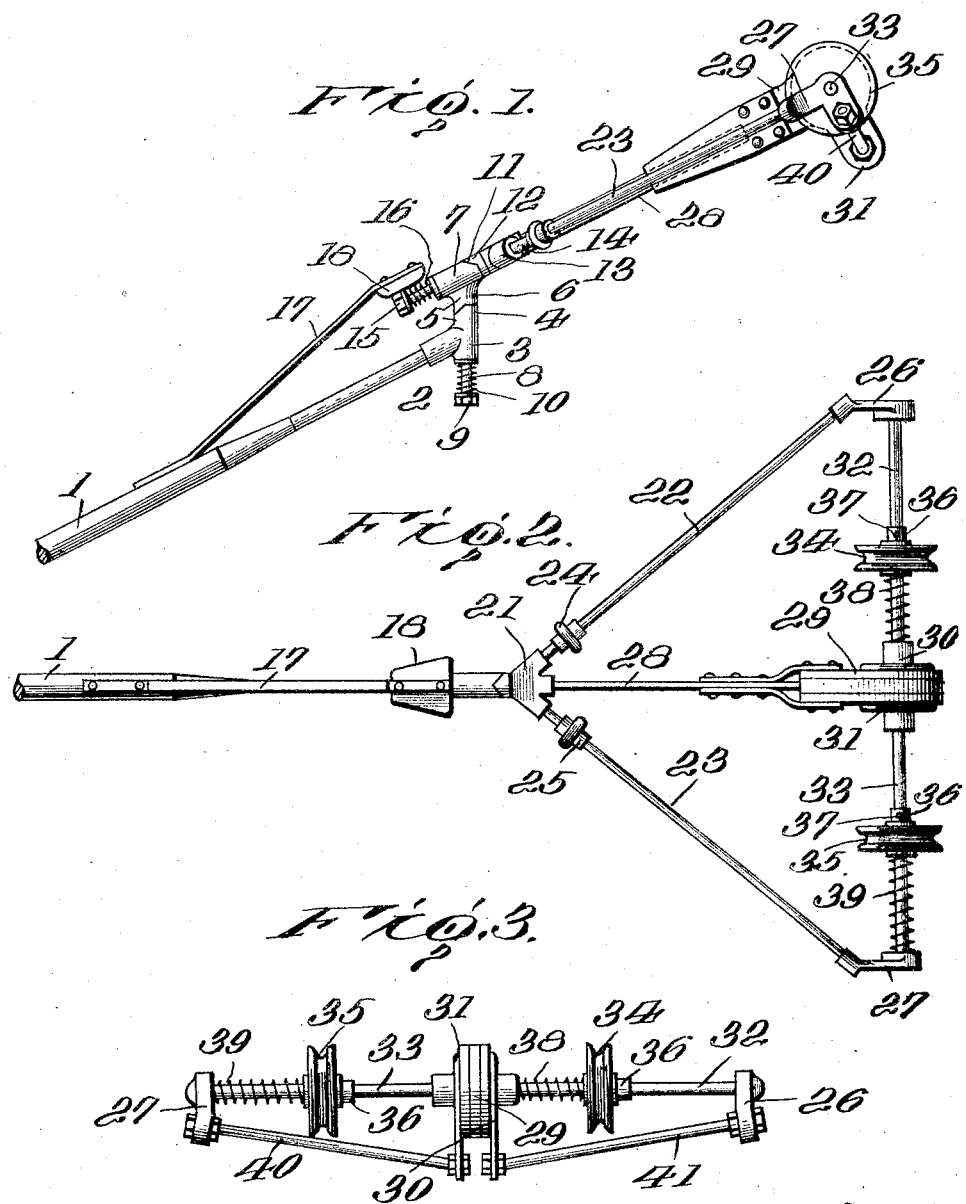

Patented Sept. 23, 1924.

1,509,665

UNITED STATES PATENT OFFICE.

CYRUS B. BUCHANAN AND CHARLES C. JOHNSON, OF RICHMOND, VIRGINIA.

CURRENT COLLECTOR.

Application filed August 1, 1921. Serial No. 488,986.

*To all whom it may concern:*

Be it known that we, CYRUS B. BUCHANAN and CHARLES C. JOHNSON, citizens of the United States, residing at Richmond, in the county of Henrico and State of Virginia, have invented certain new and useful Improvements in Current Collectors, of which the following is a specification.

Our invention relates to improvements in current collectors.

The object of our invention is to provide a current collector for conveying electric current from trolley wires to motor driven vehicles, whereby current is supplied for propelling the same and pertains more particularly for use to permit a vehicle not running on tracks to operate, and whereby current is at all times collected from the wires no matter how far the vehicle or motor is from the trolley wires, it being understood by those skilled in the art, that in operating a vehicle, the radius of operation is limited by the vertical supports on the side of the street or roadway.

Another object of our invention is to provide a collector of this character in which a positive contact is obtained from both the positive and negative wires, regardless of their relative arrangement, in respect to a horizontal line, when the vehicle is in any position in respect to the trolley wires.

Another object of our invention is to provide a current collector of this character in which the friction of the wires is greatly reduced, and in which provision is made for the trolley wheels moving longitudinally on their shafts and at the same time providing means whereby the wheels are normally held a distance apart equal to the distance between the two trolley wires, but adapted to adjust their horizontal position to any variation in the distance between the trolley wires.

In the accompanying drawings:

Figure 1 is a side elevation of our improved current collector.

Figure 2 is a top plan view of Figure 1 and

Figure 3 is a vertical transverse sectional view of Figure 1.

Referring now to the drawings: 1 represents the trolley pole which, as understood by those skilled in the art, is pivoted upon the top of the vehicle, and has its outer end entering a socket 2 in the member 3. The member 3 is provided with the cam face 4 co-operating with the cam face 5 carried by the lower end 6 of the member 7. The member 6 carries a rod 8 rigidly attached thereto and which extends down through the member 3 and carries a nut 9. Surrounding the rod between the nut 9 and the lower end of the member 3 is a coil spring 10 which normally holds the member 6 down so that the cam faces are in the position shown in Figure 1 of the drawings. The member 6 has a cam face 11 cooperating with the cam face 12 carried by the member 13.

This member 13 has a rod 14 rigidly carried thereby and passes through the member 6 and carries on its outer end a nut 15. Surrounding the rod 14 between the nut 15 and the end of the member 6 is a coil spring 16 which normally holds the members and the cam faces 11 and 12 in the position shown in Figure 1 of the drawings.

Secured to the trolley pole 1 is the guard plate 17 which has at its upper or outer free end a plate 18 which covers the member 6 and prevents the supports for the trolley wires from catching. All of the above construction is clearly and fully shown in detail in a device of this character described in an application executed under even date herewith.

The member 13 carries a plate 21 to which are rigidly connected the arms 22 and 23 which are broken and connected together by the insulating blocks 24 and 25. The outer ends 26 and 27 of the arms are turned parallel, as clearly shown in Figure 2 of the drawings.

Carried by the plate 21 is an outwardly extending rigid arm 28 which carries at its outer end the insulating blocks 29.

Carried by the outer faces of the block are the metal bushings 30 and 31 in which are mounted the two shafts 32 and 33 which have their outer ends mounted in the outer ends 26 and 27 of the arms 22 and 23.

By this structure it will be seen that the shafts are insulated from each other.

Mounted on the shafts 32 and 33 are the two trolley wheels 34 and 35 which are free to move longitudinally on the shafts, the longitudinal movement being limited by the adjustable cuffs 36 which are secured by the set-screws 37 to the shafts 32 and 33. In order to hold the wheels the proper distance apart to engage the positive and negative trolley wires, we provide the coil springs 38 and 39. The braces 40 and 41 are provided to brace the members 26 and 27.

By this structure it will be seen that the springs hold the wheels the proper distance apart, but should there be any variation in the distance between the wires, the springs will give and the wheels adjust themselves so as to prevent them from leaving the trolley wires.

The conductors are either connected to the bushings or elsewhere and then led down to the motor of the vehicle and the usual cable is connected to the trolley pole for lowering it for any desired purpose.

The trolley pole 1, as understood, is provided on the vehicle, and when the vehicle moves in its travel towards or away from the trolley wires, it swings on its pivot until side pressure on the trolley wheels is sufficient to overcome the tension of the spring of the vertical pivot, when the head will swing and the trolley wheels remain parallel with the wire. Should there be any difference in the longitudinal planes of the positive and negative wires, the tension of the spring of the horizontal pivot will be overcome and the head will adjust itself. The moment the pressure is relieved on either of the before mentioned pivots, the springs will cause the head to resume its normal position.

Having thus described our invention, what we claim and desire to secure by Letters Patent is:

1. A trolley comprising a pole, a head adapted to swing in a vertical and horizontal plane, two shafts mounted in the head and insulated from each other, a trolley wheel mounted on each shaft and longitudinally movable thereon and spring means for holding the wheels normally a predetermined distance apart.

2. A trolley comprising a pole, a head adapted to swing in a vertical and horizontal plane, two shafts mounted in the head and insulated from each other, a trolley wheel mounted on each shaft and longitudinally movable thereon and adapted to rotate thereon, and springs on the shafts on the same side of each wheel.

3. A trolley comprising a pole, a head adapted to swing in a vertical and horizontal plane, three insulated arms carried by the head, two shafts pivoted between said arms, a longitudinally movable trolley wheel on each shaft, a spring on each shaft.

4. A trolley comprising a pole, a head adapted to swing in a vertical and horizontal plane, three insulated arms carried by the head, two shafts between said arms, a trolley wheel mounted on each shaft and adapted to rotate thereon, but free to move longitudinally, and a spring on each shaft on the same side of each wheel, and adapted to maintain the trolley wheels in alignment with the trolley wires.

5. A trolley comprising a pole, a head adapted to swing in a vertical and horizontal plane, two shafts mounted in the head and insulated from each other and a trolley wheel mounted on each shaft and longitudinally movable thereon.

6. In a device of the class described, the combination of a trolley pole, a support rotatably mounted thereon, a plurality of trolley bodies slidably and rotatably mounted on said support, and means normally holding said support and said bodies in centered position.

In testimony whereof we affix our signatures.

CYRUS B. BUCHANAN.
CHAS. C. JOHNSON.